US012434082B2

(12) United States Patent
Walker et al.

(10) Patent No.: US 12,434,082 B2
(45) Date of Patent: *Oct. 7, 2025

(54) PERSONAL RESPIRATORY PROTECTION DEVICE

(71) Applicant: 3M INNOVATIVE PROPERTIES COMPANY, St. Paul, MN (US)

(72) Inventors: Garry J. Walker, Stockton-on-Tees (GB); Christopher P. Henderson, High Shincliffe (GB)

(73) Assignee: 3M Innovative Properties Company, St. Paul, MN (US)

( * ) Notice: Subject to any disclaimer, the term of this patent is extended or adjusted under 35 U.S.C. 154(b) by 923 days.

This patent is subject to a terminal disclaimer.

(21) Appl. No.: 17/576,269

(22) Filed: Jan. 14, 2022

(65) Prior Publication Data

US 2022/0134145 A1 May 5, 2022

Related U.S. Application Data

(63) Continuation of application No. 14/911,157, filed as application No. PCT/US2014/050817 on Aug. 13, 2014, now Pat. No. 11,247,079.

(30) Foreign Application Priority Data

Aug. 20, 2013 (GB) ..................................... 1314885

(51) Int. Cl.
*A41D 13/11* (2006.01)
*A62B 23/02* (2006.01)

(52) U.S. Cl.
CPC ........ *A62B 23/025* (2013.01); *A41D 13/1138* (2013.01)

(58) Field of Classification Search
CPC ........... A41D 13/1115; A41D 13/1146; A61M 16/06; A61M 16/0616; A61M 16/0683; A61M 16/107; A62B 18/025; A62B 23/025
See application file for complete search history.

(56) References Cited

U.S. PATENT DOCUMENTS 2,220,374 A * 11/1940 Lewis .................. A62B 18/025 128/206.15
2,931,356 A * 4/1960 Schwarz ........... A61M 16/0616 D24/110.4
3,521,630 A * 7/1970 Westberg ............. A62B 23/025 55/528

(Continued)

FOREIGN PATENT DOCUMENTS

BR 9101774 11/1992
BR 9102774 1/1993

(Continued)

OTHER PUBLICATIONS

International Search Report for PCT International Application No. PCT/US2014/050817, mailed on Nov. 28, 2014, 4 pages.

*Primary Examiner* — Annette Dixon

(57) ABSTRACT

The present invention relates to a personal respiratory protection device, in particular, such a device comprising a respirator body having a periphery, a filter media, forming at least part of the respirator body, and a gasket, the gasket being located at the periphery and extending along at least a portion of its length.

6 Claims, 3 Drawing Sheets

(56) References Cited

U.S. PATENT DOCUMENTS 3,779,244 A 12/1973 Weeks, Jr.
3,786,126 A * 1/1974 Reimschussel ......... B28B 1/268 264/273
3,888,246 A 6/1975 Lauer
3,890,966 A 6/1975 Aspelin
4,030,493 A 6/1977 Walters
4,319,567 A 3/1982 Magidson
4,384,577 A 5/1983 Huber
4,419,993 A 12/1983 Peterson
4,454,881 A 6/1984 Huber
4,467,073 A 8/1984 Creasy
4,616,647 A 10/1986 McCreadie
4,635,628 A 1/1987 Hubbard
4,739,755 A 4/1988 White
4,790,306 A 12/1988 Braun
4,802,473 A 2/1989 Hubbard
4,827,924 A 5/1989 Japuntich
4,850,347 A 7/1989 Skov
4,873,972 A * 10/1989 Magidson ............ A62B 18/025 128/206.15
4,941,470 A 7/1990 Hubbard
5,005,571 A * 4/1991 Dietz .................... A61M 16/06 128/207.18
5,062,421 A 11/1991 Burns
5,394,568 A 3/1995 Brostrom
5,419,318 A * 5/1995 Tayebi ............... A41D 13/1146 128/205.27
5,505,197 A 4/1996 Scholey
5,553,608 A 9/1996 Reese
5,561,863 A 10/1996 Carlson, II
5,619,989 A 4/1997 Kruger
5,673,690 A * 10/1997 Tayebi ............... A41D 13/1115 128/205.27
5,701,893 A 12/1997 Kern
5,724,964 A 3/1998 Brunson
5,813,398 A 9/1998 Baird
5,836,303 A 11/1998 Hurst
5,918,598 A 7/1999 Belfer
D413,166 S 8/1999 Snow
6,044,842 A 4/2000 Pereira
6,055,982 A 5/2000 Brunson
D442,276 S 5/2001 Geist
6,332,465 B1 12/2001 Xue
6,354,296 B1 3/2002 Baumann
6,532,598 B1 3/2003 Cardarelli
D478,660 S 8/2003 Mault
6,752,149 B2 6/2004 Gillespie
D493,523 S 7/2004 Barnett
6,817,362 B2 11/2004 Gelinas
6,988,500 B1 1/2006 Cox
7,036,507 B2 5/2006 Jensen
7,210,482 B2 5/2007 Huang
7,290,545 B2 11/2007 Kleman
D556,901 S 12/2007 Davidson
D558,331 S 12/2007 Davidson
D571,459 S 6/2008 D'Souza
D578,207 S 10/2008 D'Souza
D582,547 S 12/2008 Ungar
D588,689 S 3/2009 Guney
D591,857 S 5/2009 Peake
D591,858 S 5/2009 Peake
D594,111 S 6/2009 Reid
D597,201 S 7/2009 Brambilla
7,559,323 B2 7/2009 Hacke
D600,342 S 9/2009 D'Souza
7,686,018 B2 3/2010 Cerbini
7,703,456 B2 4/2010 Yahiaoui
7,725,948 B2 6/2010 Steindorf
7,802,572 B2 9/2010 Hahne
7,828,863 B2 11/2010 Lindstrom
D629,885 S 12/2010 Skulley
D630,315 S 1/2011 Masters
D639,419 S 6/2011 Eves
D640,011 S 6/2011 Teng
7,979,273 B2 7/2011 Haupt
D645,558 S 9/2011 Matula
11,154,735 B2 * 10/2021 Walker ............... A41D 13/1146
11,241,595 B2 * 2/2022 Walker ................. A62B 18/082
11,247,079 B2 * 2/2022 Walker ............... A41D 13/1138
2002/0005198 A1 1/2002 Kwok
2002/0056450 A1 5/2002 Lee
2004/0226563 A1 11/2004 Xu
2004/0255946 A1 12/2004 Gerson
2004/0261798 A1 12/2004 Rimkus
2006/0005838 A1 1/2006 Magidson
2006/0096598 A1 5/2006 Ho
2006/0130841 A1 6/2006 Spence
2006/0130842 A1 6/2006 Klemen
2006/0266364 A1 11/2006 Turdjian
2007/0039620 A1 2/2007 Sustello
2007/0101997 A1 5/2007 Chiesa
2008/0099022 A1 5/2008 Gebrewold
2008/0271737 A1 11/2008 Facer
2009/0000623 A1 1/2009 Lynch
2009/0283096 A1 11/2009 Cerbini
2009/0320848 A1 12/2009 Steindorf
2010/0065058 A1 3/2010 Ungar
2010/0154805 A1 6/2010 Duffy
2010/0199995 A1 8/2010 Howie
2011/0048426 A1 3/2011 Sleeper
2011/0100370 A1 5/2011 Rose
2012/0125341 A1 5/2012 Gebrewold
2012/0318272 A1 12/2012 Ho
2015/0128936 A1 5/2015 Flannigan

FOREIGN PATENT DOCUMENTS

CA 1296487 3/1992
CN 3638374 4/2007
CN 3650369 5/2007
CN 200994999 12/2007
CN 300716892 12/2007
CN 300719882 12/2007
CN 300885357 2/2009
CN 300891852 3/2009
CN 300894832 3/2009
CN 201260848 6/2009
CN 201260849 6/2009
CN 301035315 10/2009
CN 301058342 11/2009
CN 301058343 11/2009
CN 301068813 11/2009
CN 301068815 11/2009
CN 301073812 12/2009
CN 301100365 12/2009
CN 301131414 2/2010
CN 301131415 2/2010
CN 301131416 2/2010
CN 301141429 2/2010
CN 301141430 2/2010
CN 301168433 3/2010
CN 301177581 4/2010
CN 301204437 5/2010
CN 101791154 8/2010
CN 201543135 8/2010
CN 201754811 3/2011
CN 102008791 4/2011
CN 201798053 4/2011
CN 301555272 5/2011
CN 301613029 7/2011
DE 134327 2/1979
EP 0602425 6/1994
EP 0814871 1/1998
EP 0934704 8/1999
EP 1614361 1/2006
EP 000818208-0001 1/2008
EP 000818208-0002 1/2008
EP 000818208-0003 1/2008
EP 000818208-0004 1/2008
EP 000980248-0001 8/2008
EP 000980248-0002 8/2008
EP 000980248-0003 8/2008
EP 000980248-0004 8/2008

(56) References Cited

FOREIGN PATENT DOCUMENTS

| | | |
|---|---|---|
| EP | 001055669-0002 | 1/2009 |
| EP | 2298096 | 3/2011 |
| GB | 2027802 | 2/1980 |
| GB | 2092009 | 8/1982 |
| GB | 2163056 | 2/1986 |
| GB | 3010663 | 8/2003 |
| GB | 2426498 | 11/2006 |
| GB | 2446374 | 8/2008 |
| JP | H09-239050 | 9/1997 |
| JP | 2001-161843 | 6/2001 |
| JP | 3734660 | 7/2001 |
| JP | 2003-236000 | 8/2003 |
| JP | 2004-337563 | 12/2004 |
| JP | 2006-288650 | 10/2006 |
| JP | 2007-020983 | 2/2007 |
| JP | 2008-229217 | 10/2008 |
| JP | 2008-279101 | 11/2008 |
| JP | 2011-30706 | 2/2011 |
| KR | 2009-0056587 | 6/2009 |
| KR | 2009-0091274 | 8/2009 |
| KR | 2011-0024310 | 3/2011 |
| KR | 2011-0008148 | 8/2011 |
| SE | 454484 | 5/1988 |
| WO | WO 1999-30583 | 6/1999 |
| WO | WO 2003-085242 | 10/2003 |
| WO | WO 2004-101658 | 11/2004 |
| WO | WO 2005-089875 | 9/2005 |
| WO | WO 2005-099826 | 10/2005 |
| WO | WO 2006-113163 | 10/2006 |
| WO | WO 2006-113321 | 10/2006 |
| WO | WO 2007-010969 | 1/2007 |
| WO | WO 2009-029363 | 3/2009 |
| WO | WO 2009-062265 | 5/2009 |
| WO | WO 2010-062893 | 6/2010 |
| WO | WO 2015-026588 | 2/2015 |
| WO | WO 2015-026593 | 2/2015 |
| WO | WO 2015-026595 | 2/2015 |

* cited by examiner

PERSONAL RESPIRATORY PROTECTION DEVICE

BACKGROUND

Personal respiratory protection devices, also known as respirators or face masks are used in a wide variety of applications where it is desired to protect the human respiratory system from air borne particulates or noxious or unpleasant gases. Generally such respirators are in either a moulded cup-shape, such as those discussed in U.S. Pat. No. 4,827,924, or flat-folded format, such as those discussed in EP 814 871.

Moulded cup-shaped masks typically comprise at least one layer of a filter media supported by either an inner and/or an outer support shell. A gasket is provided around the inner edge of the cup-shape to ensure a good fit against the face of the wearer. The gasket is usually formed from a flexible material such that it moulds around the facial features of the wearer, providing a seal and good engagement between the mask and the face of the wearer. The quality of the fit of such respirators should be high, since it is essential that as much air as possible passes through the filter media and not around the edges of the respirator in use. Such respirators may also be provided with a valve to aid breathing.

The gasket itself is therefore a key factor in achieving reproducible, reliable fit of the respirator. Given the variation in facial features of wearers the gasket needs to be flexible enough and sized accordingly to fit around many different contours. One problematic area is around the nose of the wearer, where the respirator needs to fit closely and firmly against the skin to ensure minimal movement of the respirator during use as well as an airtight fit. To aid with fit, respirators are typically provided with a nose clip, such as a strip of metal, provided on the outer surface of the respirator and designed to be bent around the nose of the wearer to hold the respirator in place. One alternative to providing a nose-clip is to use a foamed in place gasket that fills the gap around the edge of the nose of the wearer, thus providing an improved fit. Such a solution is discussed in EP 1 614 361, where a rubber-like edge bead is moulded around the edge of the respirator, with deformable flanges included in the nasal region.

However, various issues may still arise with the use of a nose clip or other gasket: firstly, the inclusion of a nose clip may create additional manufacturing costs; secondly, the nose clip may be uncomfortable for some wearers since facial features and sizes vary greatly across the population of wearers; and thirdly, the fit achieved when not using a nose clip may be poorer in general without such close contact between the gasket and the skin of the wearer. Further, where fit is less than ideal, additional problems are encountered by wearers who also require eyewear to perform tasks, such as safety eyewear or prescription eyewear. For example, it may be difficult to wear safety glasses in the correct or a comfortable position if the base of the lenses or the frame impinges on the upper edge of the respirator or gasket. Even if worn in the correct position, a poorly fitting gasket encourages moist breath to escape the respirator and travel under the frame or lens of the eyewear, causing the eyewear to fog.

SUMMARY

It would be desirable therefore to be able to deal with all of these issues by providing a gasket that gives optimum fit for all facial types and sizes, at minimal cost increase compared with current products, or, ideally, at a lower manufacturing cost.

The present invention aims to address at least some of these issues by providing a personal respiratory protection device for use by a wearer, comprising: a respirator body having a periphery, a filter media, forming at least part of the respirator body, and a gasket, the gasket being located at the periphery and extending along at least a portion of its length, wherein the gasket is formed of a vapour impermeable flexible elastomeric material and is contoured, the contour comprising a ridge that projects away from the periphery, and wherein the ridge acts as a barrier to exhalation vapours.

The flexibility of the gasket and the contouring create an adaptable structure that confirms easily and fully to the facial features of the wearer. By acting as a barrier to exhalation vapours misting of eyewear is reduced.

Preferably, the ridge causes the personal respiratory device to sit at an angle to the face of the wearer.

Preferably, the ridge is provided with an indent adapted to accommodate the nose of a wearer.

The device may further comprise a headband means to secure the personal respiratory device onto a wearer such that the gasket flexes and conforms to the facial features of the wearer. The headband means are preferably adjustable, such that when the adjustable headband means are adjusted the gasket flexes and conforms to the facial features of the wearer.

Preferably, the ridge is deformable such that the gasket fits substantially flush against the nose and cheeks of a wearer.

Preferably, the gasket extends along substantially the entire periphery.

Preferably, the gasket fits substantially flush against the nose, cheeks and chin of a wearer.

The ridge may be formed from a local increase in thickness of elastomeric material.

Preferably, the ridge is formed in the region of the gasket that contacts the nose of a wearer during use.

The contour may be substantially V-shaped.

Preferably, the gasket comprises a thermoplastic elastomer (TPE). The gasket may be injection moulded.

Preferably, the filter media is in the form of a cover, and the respirator body comprises an inner cup shaped support and the filter media is overlaid on the inner cup shaped support. The cover and the inner cup shaped support may be joined at the periphery of the respirator body. The respirator body may comprise at least two panels.

Preferably, the gasket extends along the entire periphery of the respirator body.

Preferably, the device is a maintenance-free respirator device.

The gasket may comprise a sheet-like elastomeric material.

Preferably, the gasket is provided with an aperture adapted to accommodate the nose and mouth of a wearer.

BRIEF DESCRIPTION OF THE DRAWINGS

The present invention will now be described by way of example only, and with reference to the accompanying drawings, in which.

DETAILED DESCRIPTION

To create an improved fit without the use of nose clips, and to avoid issues resulting from poor fit, such as misting of eyewear, the present invention employs a contoured gasket formed from a vapour impermeable flexible, elastomeric material. The gasket is attached to the periphery of the personal respiratory device, and extends along at least a portion of its length. The contour comprises a ridge that projects away from the periphery, and the ridge acts as a barrier to exhalation vapours, such as moist breath. This flexibility enables the gasket to deform around the nose, cheeks and chin of a wearer, ensuring contact with the skin at all points along the gasket and therefore around the periphery of the device where it extends. Preferably the gasket extends along the entire periphery, thus creating an extremely good fit, regardless of the shape and size of the wearers' facial features. By combining good fit and a vapour impermeable material, the gasket effective prevents the fogging or misting of any eyewear worn alongside the personal respiratory protection device.

Figure 1:
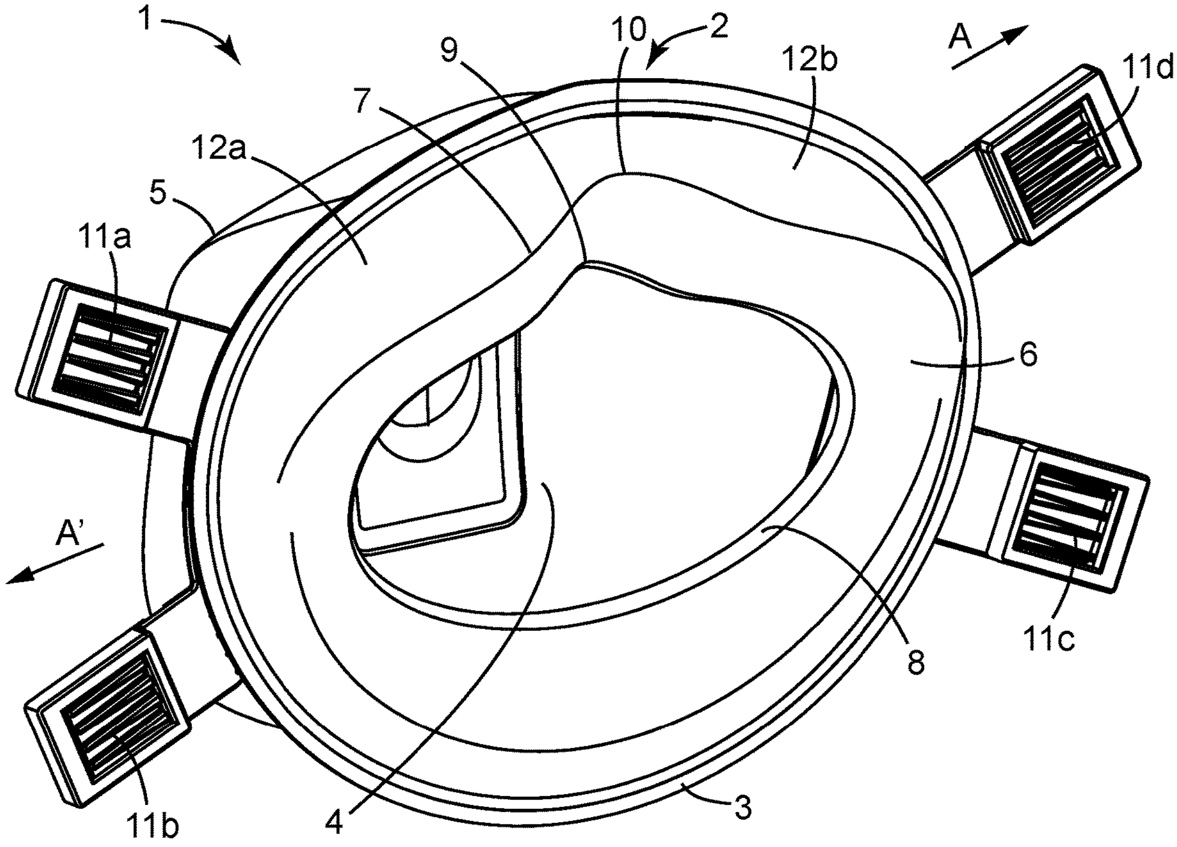
FIG. 1 is a perspective view of a personal respiratory device comprising a gasket in accordance with the present invention.

FIG. 1 is a perspective view of a personal respiratory device comprising a gasket in accordance with the present invention. The personal respiratory device 1 is generally cup-shaped, with a respirator body 2 having a periphery 3, and comprises an inner cup-shaped support 4 and a filter media in the form of an outer cover 5, the filter media being overlaid on the inner cup-shaped support 4, forming at least part of the respirator body 2. A gasket 6 is provided at the periphery 3 of the device 1, and in this embodiment, and extends around the entire periphery 3 of the device 1. The gasket 6 is formed from a vapour impermeable flexible elastomeric material. The gasket 6 is contoured, as illustrated by the contoured region, with the contour comprising a ridge 7 that projects away from the periphery 3. The ridge acts as a barrier to exhalation vapours. The ridge is deformable, and preferably forms a cushioning means for the gasket 6. The contour is substantially V-shaped. The ridge 7 is formed in the region of the gasket 6 that contacts the nose of the wearer during use, and is formed from a local increase in thickness of the elastomeric material of the gasket 6. The gasket 6 forms a central aperture 8, substantially elliptical in shape, for receiving the oro-nasal region of the wearer, such that the gasket 6 contacts the nose, cheeks and chin of the wearer. At the uppermost point, where, in use, the gasket 6 contacts the bridge of the nose of the wearer, the gasket 6 is provided with an indent 9. The indent 9 is adapted to accommodate the nose of the wearer. A flexion point 10 is disposed on the ridge 7, generally corresponding with the position of the indent 9, such that the indent 9 forms the flexion point 10. The flexion point 10 is formed from a local reduction in thickness of the elastomeric material of the gasket 6. The gasket 6 is adapted to flex about this flexion point 10.

Headband means 11*a-d* are provided to secure the device 1 onto a wearer such that the gasket 6 flexes and conforms to the facial features of the wearer. The headband means 11*a-d* are secured to the device 1 at the periphery 3 by means of ultrasonic welding. An additional lip may be provided at the periphery 3, extending around at least a part, preferably all of, the periphery, forming a base to which the headband means 11*a-d* may be attached, if desired. Preferably the headband means 11*a-d* are welded to the periphery 3, by means of ultrasonic welding, although other suitable and equivalent techniques may be used. The headband means 11*a-d* are adjustable, such that when they are adjusted the gasket 6 flexes and conforms to the facial features of the wearer. When the adjustable headband means 11*a-d* are pulled tight, the gasket 6 flexes towards the face of the wearer, about the flexion point 10, pulling the indent 9 into contact with the nose. The headband means 11*a-d* each comprise a plastic buckle, through which a length of elastic material is threaded, and can be pulled through to be lengthened and shortened as desired. Two head bands (not shown) join each of two buckles, the head bands being formed from widths of elastic material. The structure of the buckle prevents easy movement in one direction thus holding the elastic material tightly in position. Alternatively, non-adjustable headband means may be used, such as strips of braided elastic, which may be glued, welded or stapled to the periphery 3.

The region of the gasket 6 at and adjacent the indent 9 contacts the nose and cheeks of the wearer intimately, creating a good fit. This is aided by the ridge 7 being deformable such that the gasket 6 fits substantially flush against the nose and cheeks of the wearer. The ridge 7 forms a cushioning means for the gasket 6, that in use, the ridge deforms against the face of the wearer, creating a cushioning effect such that the facial features are cushioned against the periphery 3. Since the components of the device 1 are welded together, as discussed below, the periphery 3 may feel hard and uncomfortable against the face of the wearer when the adjustable headband means 11*a-d* are pulled tight to create an airtight fit for the device in use. By providing a deformable ridge 7 on the gasket 6 this is effectively avoided and the device feels comfortable and well-fitting to the wearer regardless of the size and shape of the wearers' facial features. In this example, the gasket 6 extends substantially the entire periphery 3, such that the gasket 6 fits substantially flush against the nose, cheeks and chin of a wearer.

The inner cup-shaped support 4 is preferably formed from a thermally bonded polyester non-woven air-laid staple fibre material, although may optionally be polyolefin, polycarbonate, polyurethane, cellulose or combination thereof fibre material. The outer cover web 5 is preferably formed from spun bond polypropylene bi-component fibre non-woven materials. An inner cover web, not shown, may optionally be provided between the outer cover web 5 and inner cup-shaped support 4, and is preferably also formed from spun bond polypropylene bi-component fibre non-woven material. The inner-cup shaped support 4, outer cover web 5 and gasket 6 are welded together at the periphery 3. Preferably, ultrasonic welding is used, however, thermal and other welding techniques are equally suitable. Although in this embodiment of the present invention an internal cup-shaped support is used, it may be preferable to use a different type of support or for the support to be absent altogether. For example, an external cup-shaped support may be used, with an internal filter layer, forming the respirator body 2.

Figure 2:
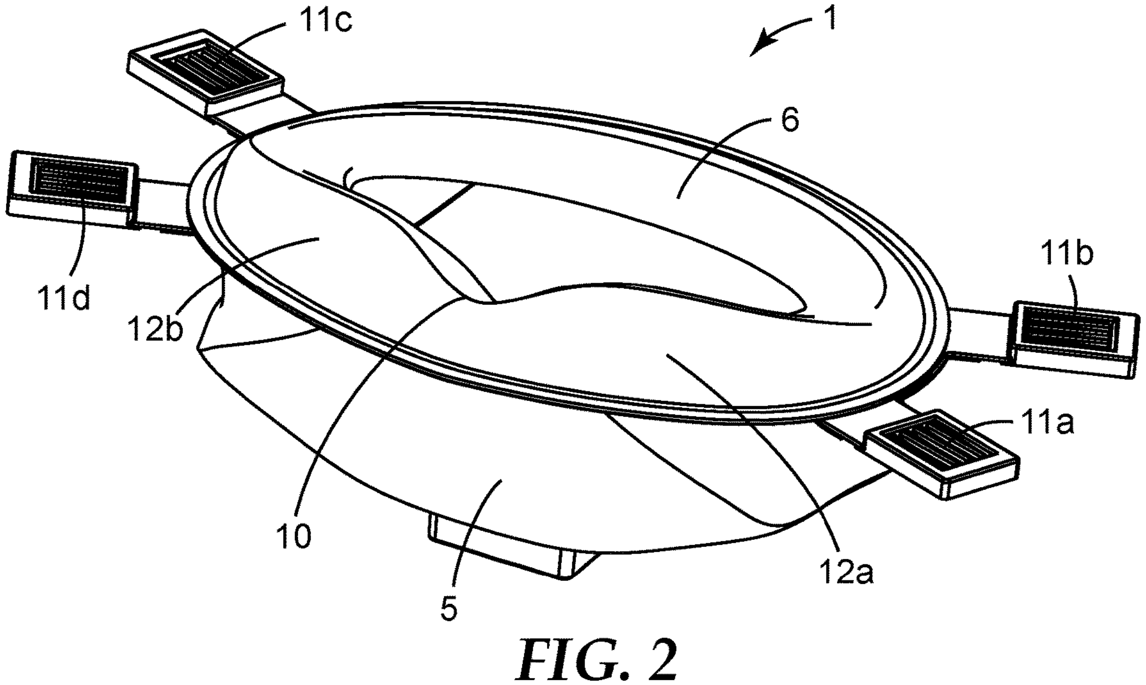
FIG. 2 is a side view of a personal respiratory device comprising a gasket in accordance with the present invention.

FIG. 2 is a side view of a personal respiratory device comprising a gasket in accordance with the present invention. This illustrates the shape of the contour in more detail. The contour is substantially V-shaped, with the apex of the "V" corresponding to the ridge 7. When the headband means 11*a-d* are pulled tight in the direction of arrows A, A', the gasket 6 flexes downwards at the flexion point pushing the regions 12*a*, 12*b* on either side of the flexion point 10 and indent 9 against the cheekbones of the wearer. The portion of the gasket 6 at the periphery 3 opposite the indent 9 is pulled tight against the chin of the wearer simultaneously. This creates an airtight fit around the entire periphery 3 of the device 1.

The gasket 6 is formed from a vapour impermeable flexible elastomeric material, preferably a thermoplastic elastomer (TPE). Suitable materials include Evoprene® G 967 and G 953, both available from AlphaGary Limited, Beler Way, Leicester Road Industrial Estate, Melton Mowbray, Leicestershire LE13 0DG, UK. Preferably the thermoplastic elastomer material is injection moulded to create the gasket 6. A two-part mould is preferably pressure-filled from at least one injection point on the face of the mould, resulting in the final gasket 6 having the at least one injection point on a surface, rather than an edge. Injecting onto the face of the mould, rather than into an edge, results in excellent resistance to tearing and mechanical strength of the finished gasket 6.

Figure 3:
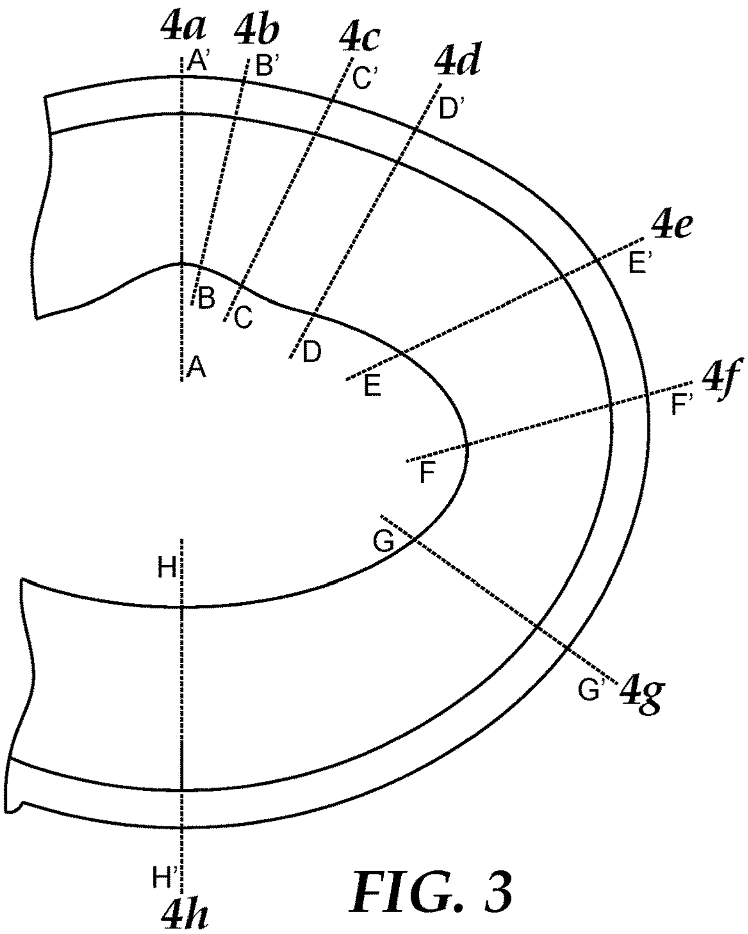
FIG. 3 is a plan view of a gasket indicating a number of cross-sections.
Figure 4A:
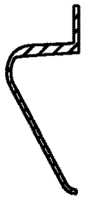
FIG. 4*a* is a cross-section along A-A' in FIG. 3

FIG. 3 is a plan view of a gasket indicating a number of cross-sections. These cross-sections show the contour and ridge 7 in more detail. FIG. 3 shows one half of the gasket 6, and it should be understood that the contouring on the half not shown is a mirror image of that in cross-sections A-A' to H-H'. FIG. 4*a* is a cross-section along A-A' in FIG. 3, and shows the thickness of the gasket 6 at the region of the indent 9 and flexion point 10. Although the nominal thicknesses below are given, these should be understood to be preferred values within a range determined by manufacturing tolerances of ±0.2 mm. In addition, both the nominal values and tolerances may change with the grade and composition of the TPE material used to manufacture the gasket 6.

Figure 4B:
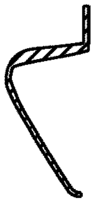
FIG. 4*b* is a cross-section along B-B' in FIG. 3.
Figure 4C:
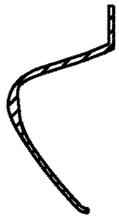
FIG. 4*c* is a cross-section along C-C' in FIG. 3.
Figure 4D:
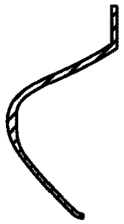
FIG. 4*d* is a cross-section along D-D' in FIG. 3.
Figure 4E:
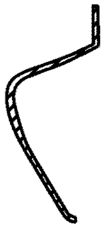
FIG. 4*e* is a cross-section along E-E' in FIG. 3.
Figure 4F:
FIG. 4*f* is a cross-section along F-F' in FIG. 3.
Figure 4G:
FIG. 4*g* is a cross-section along G-G' in FIG. 3.
Figure 4H:
FIG. 4*h* is a cross-section along H-H' in FIG. 3.

The gasket 6 has a nominal thickness of 1.67 mm in the region of the ridge 7, 0.80 mm at the periphery 3 and 0.65 mm at the remainder of the gasket 6. Hence the ridge 7 is formed by a local increase in thickness of the elastomeric material. FIG. 4*b* is a cross-section along B-B' in FIG. 3, and FIG. 4*c* is a cross-section along C-C' in FIG. 3. Here the nominal thickness of the gasket 6 at the ridge 7 is 2.04 mm and 1.73 mm respectively, indicating that the flexion point is formed from a local reduction in thickness of the elastomeric material. The thickness of the material forming the ridge 7 decreases moving away from the indent 9, as indicated in FIGS. 4*d* (1.50 mm) and 4*e* (1.14 mm). Where the ridge 7 is angled towards the central aperture 8 at sections F-F' and G-G', as shown in FIGS. 4*f* and 4*g*, the thickness increases slightly (1.34 mm and 1.67 mm respectively), where the gasket 6 contacts the jawbone of the wearer around the edges of the mouth. Finally, the portion of the gasket 6 that fits across the chin of the wearer, as shown at section H-H' in FIG. 4*h*, has approximately the same nominal thickness as the remainder of the gasket away from the ridge 7 and periphery 3, that is 0.65 mm. From FIGS. 4*b* and 4*c* in particular it can be seen how the variation in thickness of the gasket 6 allows it to deform and contact the nose and cheeks of the wearer, yet remain structural enough at the ridge 7 to form an airtight seal. Unlike prior art devices, the gasket comprises a sheet-like elastomeric material, with the performance characteristics being determined by the variations in thickness of the material and contours formed by injection moulding.

Figure 5:
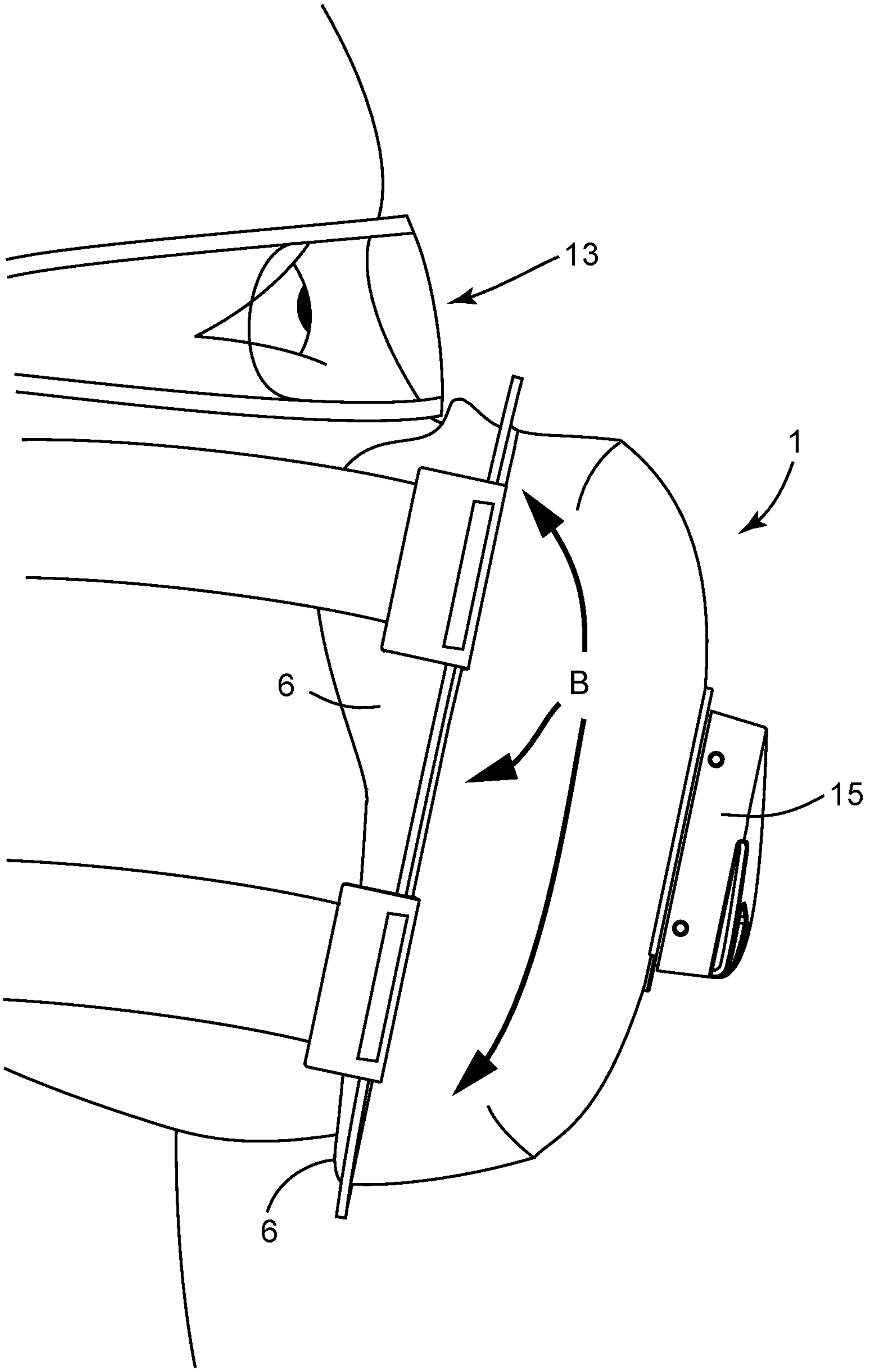
FIG. 5 is a schematic side view of a wearer wearing a personal respiratory protective device in accordance with the present invention in conjunction with eyewear.

The ridge 7 acts as a barrier to exhalation vapours, due to its vapour impermeable nature. This is particularly advantageous for wearers who also need to wear eyewear at the same time as the personal respiratory protection device 1. Since the gasket 6 forms a close fit around the nose and cheeks of the wearer by fitting substantially flush with the nose and cheeks, moist air breathed out by the wearer is substantially prevented from exiting the device 1 around the edges of the gasket 6. As little or no moist air contacts the inner or outer surfaces of eyewear being worn simultaneously with the device 1, fogging or misting of the eyewear does not occur. This is illustrated schematically in FIG. 5. In FIG. 5, eyewear 13 is worn in conjunction with the device 1. The gasket 6 is substantially flush with the cheeks and chin of the wearer. Arrows B indicate the direction of exhaled air within the device 1. It can be seen that when the wearer breathes out, air is prevented from escaping around the gasket 6 by the fit and through the gasket 6 by the use of vapour impermeable flexible elastomeric material to form the gasket 6. Air is therefore forced to flow out of the device 1 via the cover 5 and/or the valve 15.

EXAMPLES

In order to determine the effectiveness of the present invention, the fogging of a pair of typical safety eyeglasses was evaluated in conjunction with a personal respiratory protection device having a gasket as described above. This was done using the following test method.

A breathing machine was connected through a humidifier to a Sheffield dummy head. In order to prevent excess water spilling out of the dummy's mouth, the dummy head was inclined slightly such that any water ran away from the mouth. Excess water was collected in a trap if required. The breathing machine was switched on and set to 25 strokes per minute and 2 litres/stroke, and switched off again. The humidifier was then switched on and left to warm up for 30 minutes. The breathing machine was then switched back on and whilst running the temperature of the exhaled air at the mouth of the dummy head was checked using a fast response thermometer. The temperature should ideally be 37° C.+/−2° C.). Strips of cobalt chloride paper were then attached to the inside of the lens on a pair of 3M 2700 over-spectacles (available from 3M United Kingdom PLC, 3M Centre, Cain Road, Bracknell RG12 8HT), ensuring that any excess paper was trimmed. The spectacles were scribed with a grid of squares based on a template of 8 squares by 4 squares across the surface of the glasses, to enable measurement of the surface area of any fogging. Before testing, the over-spectacles were placed in a dessicator to ensure that any pre-existing moisture was removed.

Once this set-up was completed, the personal respiratory protection device 1 was fitted onto the dummy head. Masking tape was used to seal the device to the dummy head, taking care to minimise coverage of any filter material or issues with poor fitting of the gasket. The over-spectacles were then positioned on the dummy head such that the bridge of the over-spectacles coincided with the indent on the device. The breathing device was then run for 3 minutes and the amount of moisture present on the cobalt paper recorded. After this the over-spectacles and cobalt paper were returned to the dessicator, and the test repeated a further 4 times, giving 5 sets of results in total. The total grid area on the lenses of the over-spectacles was 5698 $mm^2$, therefore the percentage area of lens covered by exhaled air (fogged lens) is given by:

$$(\text{measured lens area}/5698)\times 100=\text{percentage area}$$

In addition, the weight of the over-spectacles both fogged (after testing, fogged test weight) and unfogged (after dessicating, clear test weight) was measured.

Test results are shown in Table 1 below:

TABLE 1

| Sample | Weight (clear) g | Weight (fogged) g | Clear lens % | Fogged lens % |
|---|---|---|---|---|
| 1 | 0.4580 | 0.4532 | 99.0% | 1.0% |
| 2 | 0.4611 | 0.4530 | 98.2% | 1.8% |
| 3 | 0.4614 | 0.4453 | 96.5% | 3.5% |
| 4 | 0.4674 | 0.4584 | 98.1% | 1.9% |
| 5 | 0.4599 | 0.4532 | 98.5% | 1.5% |

It can be seen from these results that only a small percentage of the surface area of the lenses of the over-spectacles was fogged, with an average of 1.9%, indicating that the gasket performs very well as a moisture barrier. A commercially available cup-shaped mask was also tested under the same conditions and gave an average of 21.3% of the surface area of the lenses of the over-spectacles as fogged.

In the above example, the device 1 is cup-shaped, with the gasket 6 extending along the entire periphery 3 of the respirator body 2. However, it may be desirable to include the gasket on a device that is not cup-shaped. For example, the respirator body 2 may comprise at least two panels, thus forming a flat fold respirator device. Preferably, the device 1 is a maintenance-free respirator device. In either case, the device may also include a valve 15. Alternatively, the device may be a reusable respirator.

What is claimed is:

1. Personal respiratory protection device for use by a wearer, comprising:

a respirator body having a periphery, a filter media, forming at least part of the respirator body, and a gasket, the gasket being located at the periphery and extending along at least a portion of its length wherein the gasket forms a central aperture for receiving an oro-nasal region of the wearer, wherein the gasket is formed of an injection moulded sheet-like vapour impermeable flexible elastomeric material and is contoured, the contour extending inwardly from the periphery of the respirator body toward the central aperture and comprising:

(i) a ridge projecting away from the periphery and the central aperture such that the ridge contacts and deforms against the face of the wearer to act as a barrier to exhalation vapours and provide a cushioning effect against the periphery of the respirator body;

(ii) an indent at an uppermost point of the gasket where the gasket contacts the bridge of the nose of a wearer; and (ii) a flexion point disposed at the indent on the ridge and formed from a local reduction in thickness of the flexible elastomeric material such that the gasket is adapted to flex about the flexion point, wherein the contour is substantially V-shaped in the region of the flexion point such that at least a portion of the flexible elastomeric material is angled away from the ridge towards the periphery and at least a portion of the flexible elastomeric material is angled away from the ridge towards the central aperture.

2. Device of claim 1, further comprising a headband to secure the personal respiratory device onto a wearer such that the gasket flexes and conforms to the facial features of the wearer.

3. Device of claim 2, wherein the headband is adjustable, such that when the adjustable headband is adjusted the gasket flexes and conforms to the facial features of the wearer.

4. Device of claim 3, wherein when the gasket flexes, the ridge deforms towards the periphery and creates an accommodation space.

5. Device of claim 4, wherein the accommodation space is adapted to accommodate eyewear.

6. Device of claim 5, wherein the eyewear does not impinge upon the gasket.

* * * * *